US012494246B2

(12) United States Patent
Sreeram et al.

(10) Patent No.: US 12,494,246 B2
(45) Date of Patent: Dec. 9, 2025

(54) APPARATUS OPERATING IN GEARDOWN MODE

(71) Applicant: Micron Technology, Inc., Boise, ID (US)

(72) Inventors: Navya Sri Sreeram, Plano, TX (US); Kallol Mazumder, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 112 days.

(21) Appl. No.: 18/583,267

(22) Filed: Feb. 21, 2024

(65) Prior Publication Data

US 2024/0321336 A1 Sep. 26, 2024

Related U.S. Application Data

(60) Provisional application No. 63/453,280, filed on Mar. 20, 2023.

(51) Int. Cl.
*G11C 11/406* (2006.01)
*G11C 11/4072* (2006.01)
*G11C 11/4076* (2006.01)

(52) U.S. Cl.
CPC .... *G11C 11/40615* (2013.01); *G11C 11/4072* (2013.01); *G11C 11/4076* (2013.01)

(58) Field of Classification Search
CPC .......... G11C 11/40615; G11C 11/4072; G11C 11/4076; G11C 11/4074; G11C 5/02; G06F 3/061; G06F 3/0625; G06F 3/0626; G06F 3/0658; G06F 3/0659; G06F 3/0673
See application file for complete search history.

(56) References Cited

U.S. PATENT DOCUMENTS 12,347,517 B2 * 7/2025 Kim .................... G11C 7/1039

* cited by examiner

*Primary Examiner* — Sultana Begum
(74) *Attorney, Agent, or Firm* — Dorsey & Whitney LLP

(57) ABSTRACT

Methods, apparatuses, and systems related to an apparatus implementing a geardown mode in a parallel pipeline configuration. The apparatus can include mechanisms to manage signal timing across multiple data processing pipelines for different communication speeds. While operating in a geardown mode, the apparatus can capture a sync pulse in two or more data pipelines. The apparatus can identify the pipeline that first captured the sync pulse and suppress the operation of the other pipelines.

20 Claims, 8 Drawing Sheets

500
GDmode
SyncPulse
D
CK
Q
Rf
GDLockout_local
GDLockout
GDLockout = HIGH
Chip is in geargown
PwrUpRst
VPERI!
RstSrefF
RstGDF
SREF_CSIB
A
Yf
lor2K1
VPW = VSS!
VNW = VPERI!

550
VSS!
MRGDmode
MPC_GDEn
MPCGDmode
m1
GDEnF
GDEn
Even_detectedF
GDEnF
VPERI!
D
CK
Q
Rf
SwapEOLock
out
SwapEOLockout = HIGH
Even pipeline "sync" pulse detected.
Odd pipeline reset initiated /detected.
SwapEOLockout = LOW
Odd pipeline "sync" detected
Even pipeline reset initiated/detected
Odd_detected
GDEn
RstGDF
MRGDF
VNW = VPERI!
VPW = VSS!
VPERI!

700
ENTER GEARDOWN MODE 702
IDENTIFY PIPELINE THAT RECEIVED SYNC PULSE FIRST 704
GENERATE MASK FOR OTHER PIPELINE 706
BLOCK THE MASKED PIPELINE 708
DECODE COMMANDS FROM FIRST PIPELINE 710

APPARATUS OPERATING IN GEARDOWN MODE

CROSS-REFERENCE TO RELATED APPLICATION(S)

The present application claims priority to U.S. Provisional Patent Application No. 63/453,280, filed Mar. 20, 2023, the disclosure of which is incorporated herein by reference in its entirety.

TECHNICAL FIELD

The disclosed embodiments relate to apparatuses, and, in particular, to semiconductor devices with a mechanism for managing data operations while operating in a geardown mode.

BACKGROUND

An apparatus (e.g., a processor, a memory device, a memory system, or a combination thereof) can include one or more semiconductor circuits configured to store and/or process information. For example, the apparatus can include a memory device, such as a volatile memory device, a non-volatile memory device, or a combination device. Memory devices, such as dynamic random-access memory (DRAM), can utilize electrical energy to store and access data. For example, the memory devices can include Double Data Rate (DDR) RAM devices that implement DDR interfacing scheme (e.g., DDR4, DDR5, etc.) for high-speed data transfer.

With technological advancements in other areas and increasing applications, the market is continuously looking for faster, more efficient, and smaller devices. To meet the market demand, the semiconductor devices are being pushed to the limit with various improvements. Improving devices, generally, may include increasing circuit density, increasing operating speeds or otherwise reducing operational latency, increasing reliability, increasing data retention, reducing power consumption, or reducing manufacturing costs, among other metrics. However, such improvements can often introduce challenges in subsequent data processing, such as due to decrease in time windows to achieve targeted transitions, and create sources of error in data transfers if not handled appropriately.

DETAILED DESCRIPTION

Figure 1:
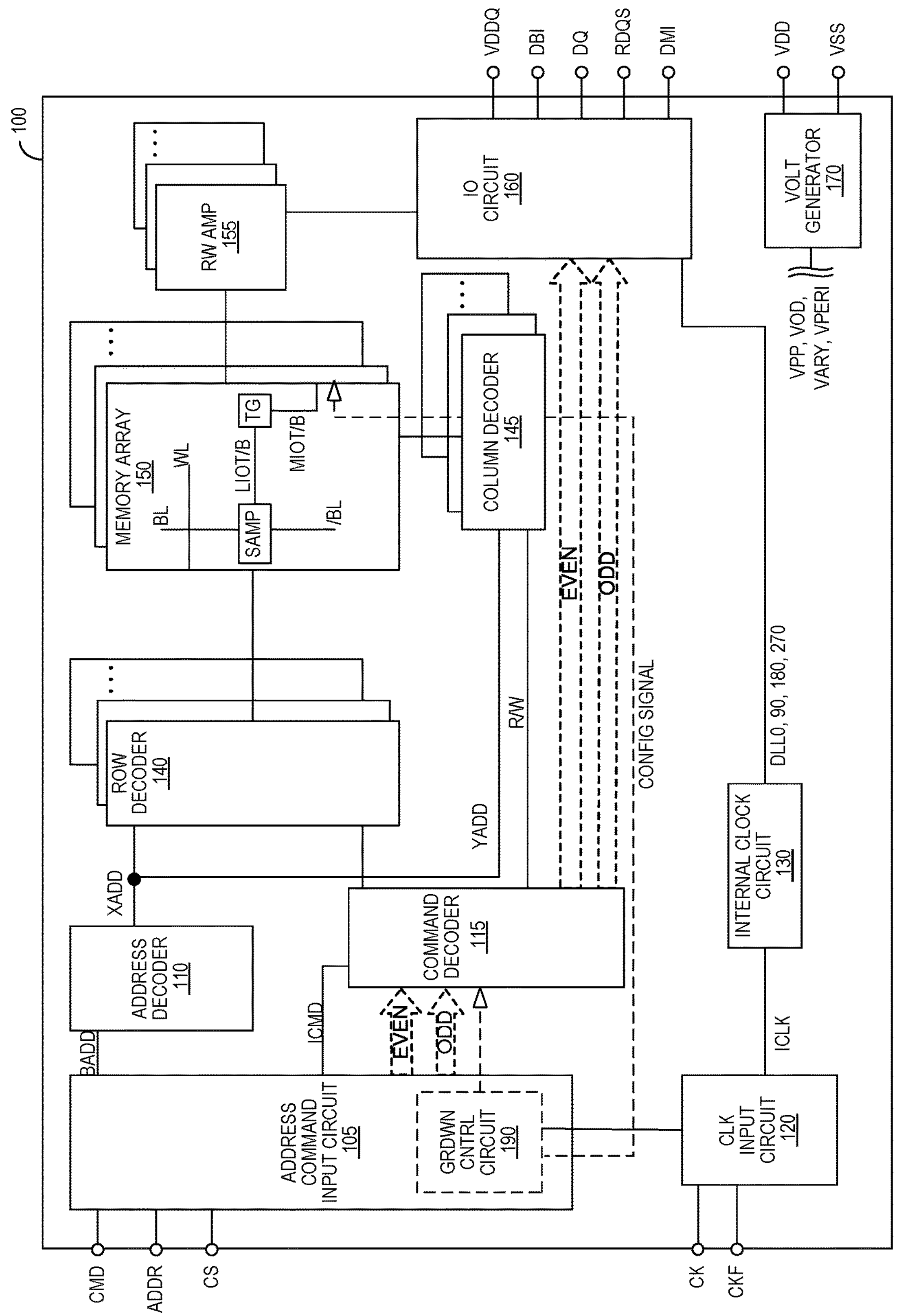
FIG. 1 is a block diagram of an apparatus in accordance with an embodiment of the present technology.

As described in greater detail below, the technology disclosed herein relates to an apparatus, such as for memory systems, systems with memory devices, related methods, etc., for implementing a geardown mode in a parallel pipeline configuration. The apparatus can include mechanisms to manage signal timing across multiple data processing pipelines for different communication speeds (e.g., the speed of the signals between a controller/host and a memory device).

As operating speeds for an apparatus increase with faster clock cycles, it can become difficult for an apparatus to capture the external inputs in a single clock interval. For example, the setup time for a command becomes shorter with increased operating speeds, thus reducing the duration allotted for memory devices to implement necessary circuit configurations/operations. Some systems or standards allow the apparatus to expand the setup time window by operating in a geardown mode. For the geardown mode, the internal clock operates at a reduced speed (e.g., half frequency or another speed as designated by manufacturer specification, standards, or the like) relative to the external clock. Using geardown as an example, the reduced speed can effectively expand the setup window to double that of the external clock.

To further enable timing flexibilities, the apparatus (e.g., a memory device and/or system including the memory device) can include a set of parallel data pipelines (e.g., an even pipeline and an odd pipeline) for separately processing different portions of a unit of data in parallel. Using the two (even and odd) pipeline configuration as an illustrative example, the apparatus can include a pair of half-frequency clocks, such as an even clock and an odd clock, where the rising edges of both clocks correspond to or aligned with alternate rising edges of the external clock. For example, the even clock and the odd clock can have a frequency that is half that of an external clock. The apparatus can use the even clock for timing operations performed by the even pipeline and the odd clock for timing the operations performed by the odd pipeline.

For the sake of brevity and for illustrative purposes, the set of parallel data pipelines are described using the two-pipeline (e.g., even and odd pipelines) configuration. However, it is understood that the various embodiments described below can be implemented in other configurations, such as for devices have three or more parallel data pipelines.

The apparatus can include a control mechanism (e.g., a geardown control circuit) to leverage and further increase the efficiency of the multi-pipeline configuration in implementing the geardown mode. For example, given the increased clock period, the even clock and odd clock can both overlap a common pulse of the external clock. As a result, a timing for the geardown mode (e.g., a timing or a sync pulse (e.g., low frequency sync pulse, a no operation (NOP) command, etc.) representative of receiving a geardown command from a controller) can overlap both the even clock and the odd clock. As such, the apparatus can include the control mechanism configured to identify the internal clock and the corresponding pipeline that first captured the sync pulse and control the subsequent commands and data processing.

The apparatus can generate a mask (via, e.g., two stage shifters) for each pipeline, that when activated, suppress/block one of the pipelines. Once the apparatus identifies the pipeline that received the sync pulse first, the apparatus blocks the other pipeline. By blocking the pipeline that received the sync pulse second, the apparatus can ensure that the commands are decoded in the pipeline that captured the sync pulse first rather than both pipelines. In other words, the control mechanism can identify and utilize the pipeline having the clock signal with the active pulse that first corresponds with the geardown initiation (e.g., received command). The control mechanism can block operations at the other/remaining pipeline(s).

As an illustrative example, the external device (e.g., a controller) can interact with the apparatus (e.g., a memory device, such as a DDR memory) according to an external clock. The external device can issue a command according to the external clock and the apparatus can receive the provided sync pulse according to the external clock. The apparatus can track which pipeline first receives the sync pulse and the corresponding internal clock. For the example of two pipelines and the geardown configuration for reducing the operations speed to half that of the highspeed configuration, the apparatus can arbitrarily label alternating pulses of the external clock as even and odd pulses. An even pipeline and an even clock can correspond to the even external clock pulses, and an odd pipeline and an odd clock can correspond to the odd external clock pulses. In processing a sync pulse, the apparatus can track the even/odd status of the external clock at the time of receiving the sync pulse. If the sync pulse is received on an even clock pulse, the apparatus can use the even pipeline and block the odd pipeline. Blocking the odd pipeline ensures that output data is delivered according to the even timing. If the sync pulse is received on an odd clock pulse, the apparatus can use the odd pipeline and block the even pipeline. Blocking the even pipeline ensures that output data is delivered according to the odd clock.

As described in detail below, embodiments of the present technology can include circuits/functions configured to implement a geardown mode in a parallel pipeline configuration. For example, the apparatus (e.g., the memory device) can include 1) a circuit configured for identifying the pipeline that receives the first sync pulse, 2) a circuit configured for blocking the pipeline that received the sync pulse second, and 3) a circuit configured with entry logic of a geardown mode. Embodiments of the present technology can provide technical advantages over conventional technology and include circuits/functions to 1) save power as the apparatus operates at half speed of the external clock, 2) remove complexity within the apparatus by using a single pipeline instead of both pipelines, and 3) improve efficiency since no “ghost” commands are captured in the blocked pipeline.

FIG. 1 is a block diagram of the apparatus 100 (e.g., a semiconductor die assembly, including a 3DI device or a die-stacked package) in accordance with an embodiment of the present technology. For example, the apparatus 100 can include a DRAM (e.g., DDR4 DRAM, DDR5 DRAM, LP DRAM, HBM DRAM, etc.), or a portion thereof that includes one or more dies/chips. In some embodiments, the apparatus 100 can include synchronous DRAM (SDRAM) of DDR type integrated on a single semiconductor chip.

The apparatus 100 may include an array of memory cells, such as memory array 150. The memory array 150 may include a plurality of banks (e.g., banks 0-15), and each bank may include a plurality of word lines (WL), a plurality of bit lines (BL), and a plurality of memory cells arranged at intersections of the word lines and the bit lines. Memory cells can include any one of a number of different memory media types, including capacitive, magnetoresistive, ferroelectric, phase change, or the like. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The memory array 150 may also include plate lines and corresponding circuitry for managing their operation.

The apparatus 100 may employ a plurality of external terminals that include command and address terminals coupled to a command bus and an address bus to receive command signals (CMD) and address signals (ADDR), respectively. The apparatus 100 may further include a chip select terminal to receive a chip select signal (CS), clock terminals to receive clock signals CK and CKF, data terminals DQ, RDQS, DBI, and DMI, power supply terminals VDD, VSS, and VDDQ.

The command terminals and address terminals may be supplied with an address signal and a bank address signal (not shown in FIG. 1) from outside. The address signal and the bank address signal supplied to the address terminals can be transferred, via a command/address input circuit 105 (e.g., command circuit), to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal and supply the bank address signal to both the row decoder 140 and the column decoder 145.

The command and address terminals may be supplied with command signals (CMD), address signals (ADDR), and chip select signals (CS), from a memory controller. The command signals may represent various memory commands from the memory controller (e.g., including access commands, which can include read commands and write commands). The chip select signal may be used to select the apparatus 100 to respond to commands and addresses provided to the command and address terminals. When an active chip select signal is provided to the apparatus 100, the commands and addresses can be decoded and memory operations can be performed. The command signals may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The command decoder 115 may further include one or more registers for tracking various counts or values (e.g., counts of refresh commands received by the apparatus 100 or self-refresh operations (e.g., a self-refresh entry/exit sequence) performed by the apparatus 100).

Read data can be read from memory cells in the memory array 150 designated by row address (e.g., address provided with an active command) and column address (e.g., address provided with the read). The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the apparatus 100, for example, in a mode register (not shown in FIG. 1). The read latency information RL can be defined in terms of clock pulses of the CK clock signal. For example, the read latency information RL can be a number of clock pulses of the CK signal after the read command is received by the apparatus 100 when the associated read data is provided.

Write data can be supplied to the data terminals DQ, DBI, and DMI. The write command may be received by the command decoder 115, which can provide internal commands to the input/output circuit 160 so that the write data can be received by data receivers in the input/output circuit 160 and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the apparatus 100, for example, in the mode register (not shown in FIG. 1). The write latency WL information can be defined in terms of clock pulses of the CK clock signal. For example, the write latency information WL can be a number of clock pulses of the CK signal after the write command is received by the apparatus 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks.

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK and CKF can be supplied to a clock input circuit 120 (e.g., external clock circuit). The CK and CKF signals can be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a clock/enable signal from the command decoder 115, an input buffer can receive the clock/enable signals. The clock input circuit 120 can receive the external clock signals to generate internal clock signals ICK. The internal clock signals ICK can be supplied to an internal clock circuit 130. The internal clock circuit 130 can provide various phase and frequency controlled internal clock signals based on the received internal clock signals ICK and a clock enable (not shown in FIG. 1) from the command/address input circuit 105. For example, the internal clock circuit 130 can include a clock path (not shown in FIG. 1) that receives the internal clock signal ICK and provides various clock signals to the command decoder 115. The internal clock circuit 130 can further provide input/output (IO) clock signals. The IO clock signals can be supplied to the input/output circuit 160 and can be used as a timing signal for determining an output timing of read data and the input timing of write data. The IO clock signals can be provided at multiple clock frequencies (e.g., provide IO clock signals at half the frequency of the external clock signal) and/or different phases (e.g., provide IO clock signals phase sifted by 0, 90, 180, and/or 270 degrees from the external clock signal) so that data can be output from and input to the apparatus 100 at different data rates. A higher clock frequency may be desirable when high memory speed is desired. A lower clock frequency may be desirable when lower power consumption is desired. The internal clock signals ICK can also be supplied to a timing generator and thus various internal clock signals can be generated. When the apparatus 100 operates in a geardown mode, the internal clock circuit 130 operates at half frequency relative to the external clock signals CK and CKF supplied to the clock input circuit 120.

The apparatus 100 can be connected to any one of a number of electronic devices capable of utilizing memory for the temporary or persistent storage of information, or a component thereof. For example, a host device of apparatus 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to apparatus 100, although in other embodiments, the host device may be indirectly connected to memory device (e.g., over a networked connection or through intermediary devices).

The apparatus 100 can include an 'N' number of command pipelines configured to process commands (e.g., read commands and/or write commands) in parallel according to internal clock signals having a frequency reduced by a factor of '1/N' in comparison to the external clock (e.g., CK/CKF). The parallel pipelines can be implemented using circuitry across the command/address input circuit 105, the command decoder 115, the memory array 150, the input/output circuit 160, and/or other circuits described above.

For coordinating the memory operations using the parallel pipelines, the command/address input circuit 105 can include a geardown control circuit 190 configured to control the operation of the parallel pipelines (e.g., even pipeline and odd pipeline) for the geardown mode. In some embodiments, the geardown control circuit 190 can be configured to identify the geardown mode operation (by, e.g., identifying a received command, reading a mode register, or the like).

After identifying the geardown mode, the geardown control circuit 190 can generate and control one or more configuration signals (e.g., a mask, an enable, or the like) based on a subsequently received memory operation command (e.g., first NOP command for a self-refresh exit (SRX) sequence operation as sync pulse) received at the command/address input circuit 105. When the command is received at the command/address input circuit 105, the geardown control circuit 190 can determine whether the command was received on an even clock or an odd clock. Based on the determination, the geardown control circuit 190 can generate the configuration signal to block/suppress the pipeline that received the command second. The geardown control circuit 190 can generate and communicate one or more corresponding enable or mask signals to circuit corresponding to the pipelines, such as the command decoder 115, address decoder 110, the row decoder 140, the column decoder, 145, the memory array 150, the I/O circuit 160, or a combination thereof.

Figure 2:
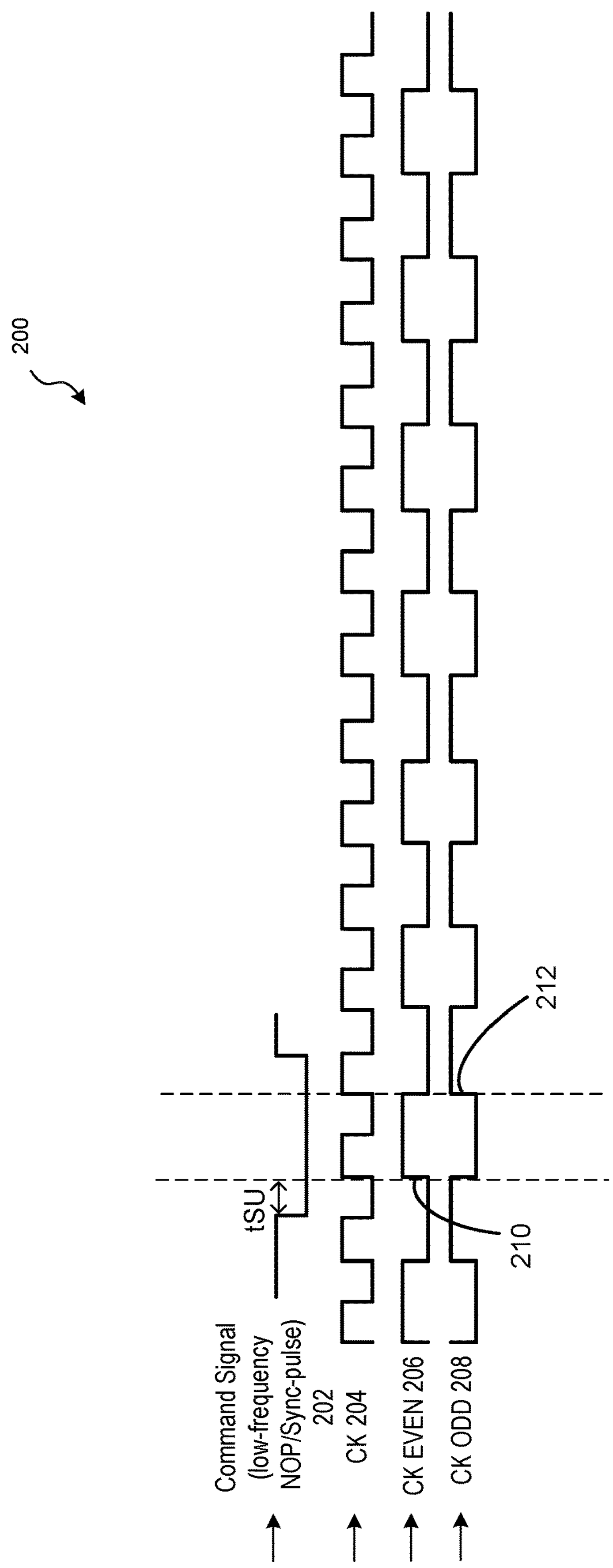
FIG. 2 illustrates a timing diagram of internal and external clocks in accordance with an embodiment of the present technology.

FIG. 2 illustrates a timing diagram 200 of internal clock signals CK even 206 and CK odd 208, an external clock signal CK 204, and a command signal 202 (e.g., low-frequency NOP/sync pulse) in accordance with an embodiment of the present technology. The clock circuit (e.g., the clock input circuit 120 of FIG. 1) can process the external clock signal CK 204, generated by an external device according to an external frequency. For the even and odd pipeline configuration, the apparatus can identify the external clock signal CK 204 as a repeating sequence of 2 clock pulses. Each rising edge in the repeating sequence of 2 pulses will correspond to one of 2 pipelines (e.g., an even pipeline or an odd pipeline). For illustrative purposes, embodiments of the present technology will be described using a two-pipeline configuration where the external clocks correspond to even and odd pulses. However, it is understood that the apparatus may be implemented with any number of pipelines (i.e., N>2) and corresponding patterns for the clock division.

In some embodiments, such as for DDR devices, the internal clock circuit 130 can generate the internal clock signals CK even 206 and CK odd 208 based on the external clock signal CK 204. Internal clock signals CK even 206 and CK odd 208 can have an internal frequency that is ½ of that of the external clock signal 204 given the arbitrary division of the external clock signal CK 204 into a sequence of 2 pulses. As an illustrative example, CK even 206 can be aligned with the rising edge of a first external clock pulse and CK odd 208 can be aligned with a rising edge of a second external clock pulse immediately following the first external clock pulse. For DDR implementations, the internal clock signals CK even 206 and CK odd 208 can be used to coordinate communication of data (e.g., read data) between the memory device and the controller/host.

The apparatus can receive the command signal 202 (e.g., sync pulse) in the even pipeline according to the CK even 206 and in the odd pipeline according to the CK odd 208. Following the setup time (tSU) of the command signal 202, the apparatus 100 can identify which of the even or odd clock signal that first has the rising edge. While the command signal 202 overlaps the rising edge 210 of the CK even 206 and the rising edge 212 of the CK odd 208, the apparatus 100 can identify the CK even 206 as having the next/first rising edge (e.g., rising edge 210 of the CK even 206) following the tSU. Thus, in the illustrated example, the command signal 202 is first detected and processed by even pipeline according to the CK even 206.

Figure 3:
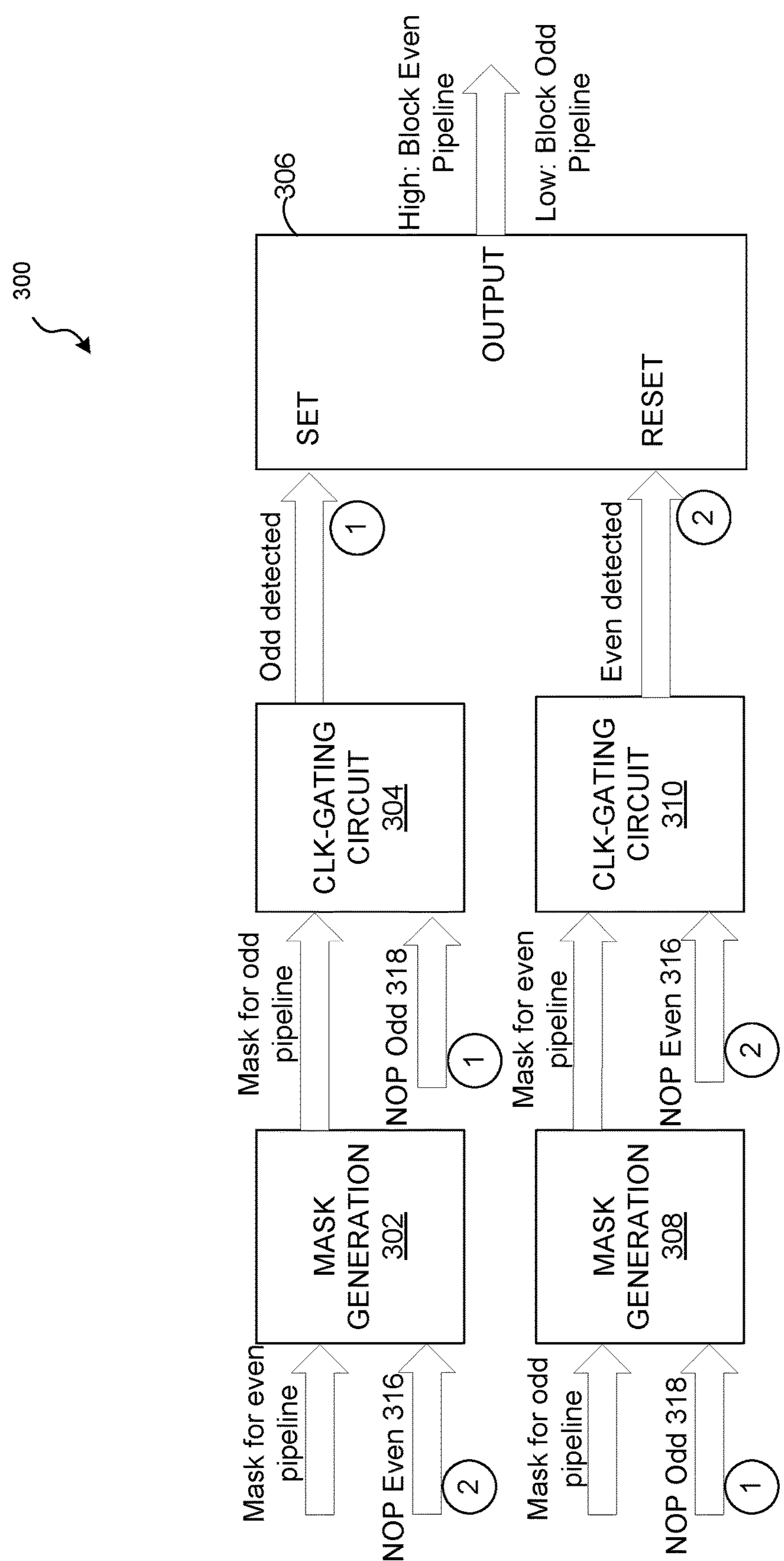
FIG. 3 is a block diagram of a circuit configured for identifying a pipeline used in a geardown mode in accordance with an embodiment of the present technology.

FIG. 3 is a block diagram 300 of a circuit (e.g., the geardown control circuit 190 of FIG. 1 or a portion thereof) configured for identifying a pipeline used in a geardown mode in accordance with an embodiment of the present technology. The apparatus (e.g., the apparatus 100 of FIG. 1) can include a set/reset block 306 (e.g., a set/reset latch) to determine whether the odd pipeline or the even pipeline first captured the sync pulse (e.g., the command signal 202 or a corresponding CA address packet). The apparatus can identify the pipeline that first captured the sync pulse and block the pipeline that captured the sync pulse second.

The apparatus can use two-stage shifter components to generate a mask to block the secondary pipeline. For example, a mask generation block 302 can generate a mask for the odd pipeline when a NOP command (e.g., NOP 316) is captured first in an even pipeline. An even mask generation block 308 can generate a mask for the even pipeline when a NOP command (e.g., NOP 318) is captured first in an odd pipeline.

In the illustrative example of FIG. 3, a CK-gating circuit block 304 can detect the NOP 318 in the odd pipeline prior to the CK-gating circuit block 310 detecting the NOP 316 in the even pipeline. The set/reset block 306 can block the even pipeline with a mask by resetting clocks (e.g., a first clock used to capture command address bits, and a second clock used to capture a decoded command) used to receive commands via the even pipeline. The set/reset block 306 can decode commands in the odd pipeline by setting the odd pipeline as the only pipeline receiving data. In other words, the complementary one of NOP commands can be used as a trigger to generate the mask in the first stage (e.g., the generation circuits 302/308). The corresponding one of the NOP can be used as a trigger at the second stage (e.g., the gaiting circuits 304/310) to identify the pipeline that first received the command.

Figure 4:
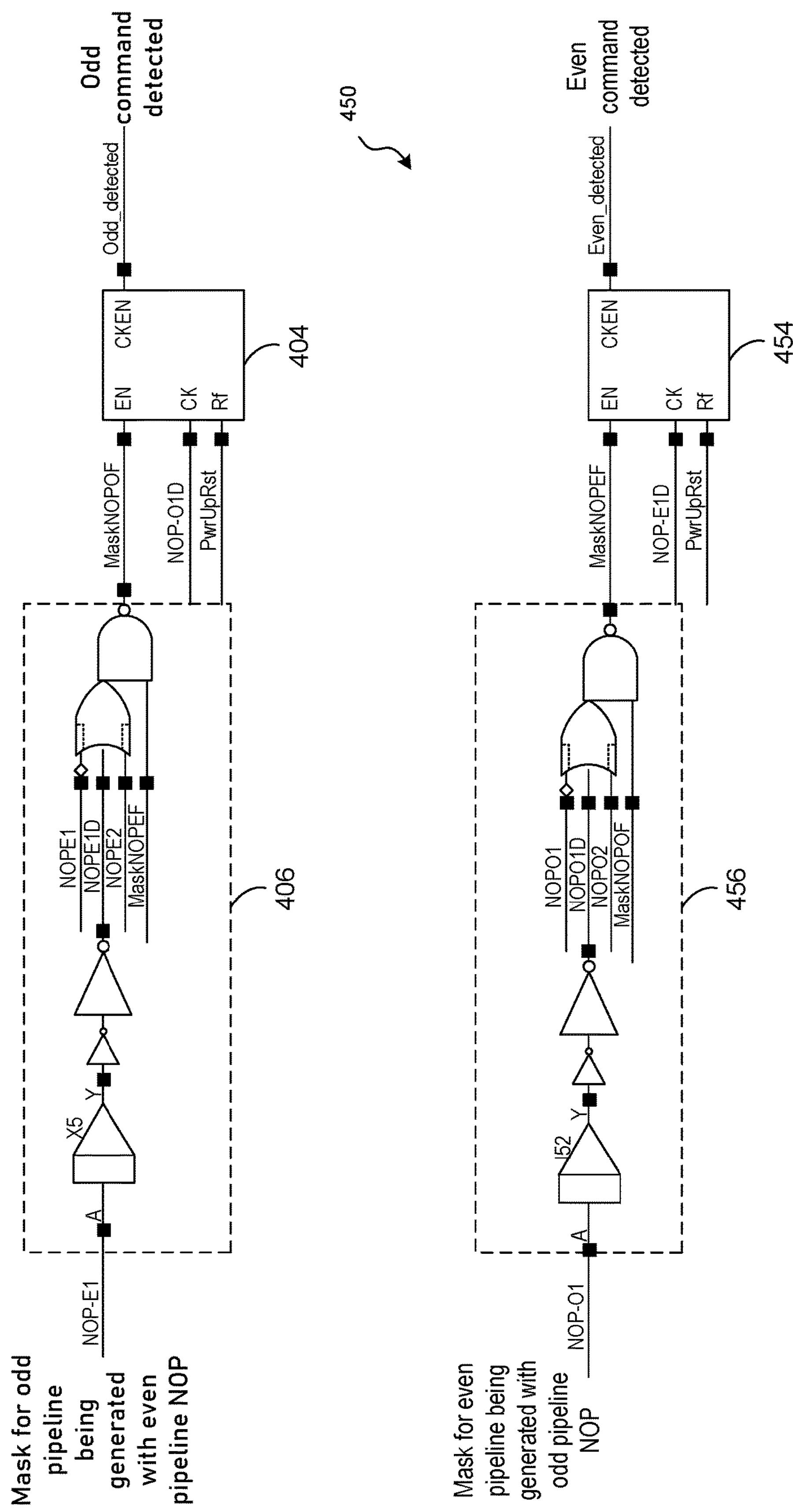
FIG. 4 illustrates circuits configured for identifying a pipeline used in a geardown mode in accordance with an embodiment of the present technology.

FIG. 4 illustrates a circuit 400 and a circuit 450 configured for identifying a pipeline when operating in a geardown mode in accordance with an embodiment of the present technology. The circuit 400 can include a detailed example of the mask generation block 302 of FIG. 3 and the gaiting circuit 304 of FIG. 3, and the circuit 450 can include a detailed example of the mask generation block 308 of FIG. 3 and the gaiting circuit 310 of FIG. 3.

In circuit 400, a block 404 (e.g., clock-gating) can correspond to the gaiting circuit 304. The block 404 can receive an indication that a sync pulse (e.g., NOP-E1) was detected in the even pipeline before the sync pulse was detected in the odd pipeline. The circuit 400 can include a set of logic components 406 that correspond to the mask generation block 302 and generate a mask (e.g., MaskNOPOF) for the odd pipeline to block/suppress the odd pipeline. Block 404 can use the NOP-O1D as a clock input to clock-gate 404 with the mask (MaskNOPOF) of the odd pipeline, to detect if the command arrived in the odd pipeline.

In circuit 450, a block 454 (e.g., clock-gating) can correspond to the gaiting circuit 310. The block 454 can receive an indication that a sync pulse (e.g., NOP-O1) was detected in the odd pipeline before the sync pulse was detected in the even pipeline. The circuit 450 can include a set of logic components 456 that correspond to the mask generation block 308 and generate a mask (e.g., MaskNOPEF) for the even pipeline to block/suppress the even pipeline. Block 454 can use the NOP-E1D as a clock input to clock-gate 454 with the mask (e.g., MaskNOPEF) of the even pipeline, to detect if the command arrived in the even pipeline.

Circuits 400 and 450 can include circuitry for determining whether an odd pipeline or an even pipeline first captured a sync pulse and generating a mask to block the pipeline that captured the sync pulse second. For example, circuits 400 and 450 can include an arrangement of inverter or NOT gates, NAND gates, NOR gates, buffer gates, a set/reset block, or any components used to identify a pipeline that first captured a sync pulse and block alternate pipelines.

Figure 5:
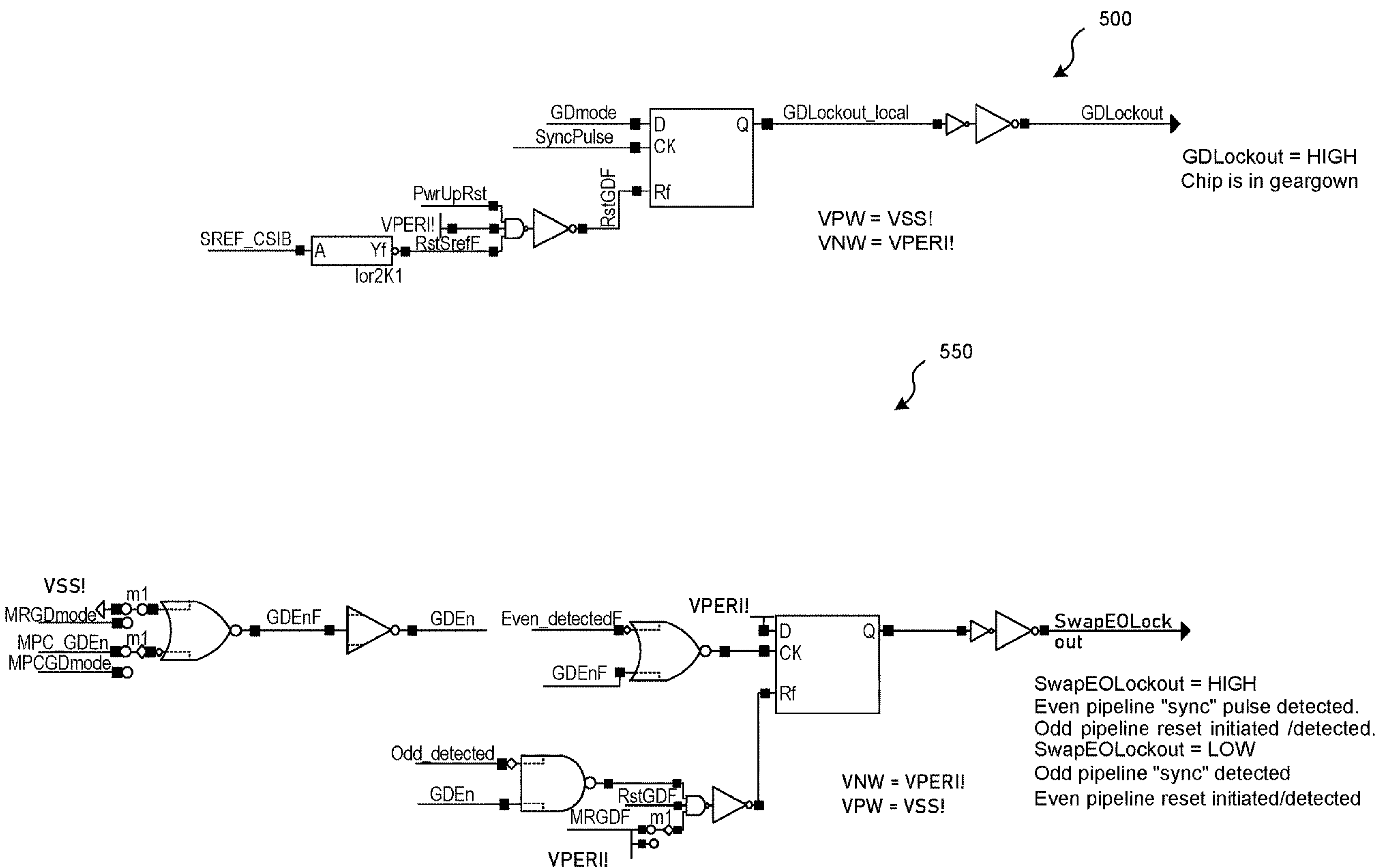
FIG. 5 illustrates circuits configured for deactivating or disabling a pipeline during geardown mode operations in accordance with an embodiment of the present technology.

FIG. 5 illustrates a circuit 500 and a circuit 550 configured for deactivating or disabling a pipeline during geardown mode operations, in accordance with an embodiment of the present technology. In other words, the circuits 500 and 550 can represent mechanisms to block the pipeline that did not first receive the sync-pulse in the geardown mode. As such, the circuit 500, the circuit 550, or both can correspond to the set/reset block 306 of FIG. 3 or other circuits described above.

Once the apparatus (e.g., the apparatus 100 of FIG. 1) identifies the pipeline (e.g., even or odd pipeline) that first captured the sync pulse, the apparatus can suppress/block the pipeline (non-selected or second-receiving pipeline) that captured the sync pulse second. Blocking the second-receiving pipeline can ensure that the commands are decoded in the first-receiving pipeline rather than doubling the efforts across both pipelines. Blocking the second-receiving pipeline can also ensure that the apparatus saves power and other resources by utilizing one half-frequency clock (e.g., even clock or odd clock) and related processes/pipeline during the geardown operation.

The apparatus can generate two or more signals to block the second-receiving pipeline. A first signal (e.g., an output generated by a geardown detection circuit 500) identifies whether the apparatus is operating in a geardown mode. For example, a command (e.g., GDLockout=HIGH) can indicate that the apparatus is to enter or is already operating in the geardown mode.

A second signal (e.g., an output generated by a capture identification circuit 550) identifies if the sync pulse was first captured in the even pipeline or the odd pipeline. For example, a command (e.g., SwapEOLockout=HIGH) indicates the sync pulse was first detected in the even pipeline. In a second example, a command (e.g., SwapEOLockout=LOW) indicates the sync pulse was first detected in the odd pipeline. The circuit 550 can generate the output based on detection signals, such as Even-detectedF and/or Odd_detected. In some embodiments, the circuit 550 can generate the SwapEOLockout based on the detection results provided by the circuits 400 and 450 of FIG. 4, the clock-gaiting circuits 304 and 310 of FIG. 3, or a combination thereof. The circuit 550 can identify that the even pipeline first received the sync pulse by receiving an Even-detectedF signal in a flip-flop component.

When the command signal 202 is received on the even pulse, the apparatus can utilize the first and second signals to block the other pipeline (e.g., the odd pipeline) by generating a "reset" signal. The reset signal can reset the clock (e.g., ClckCA) used downstream to capture command address bits (at, e.g., address command input circuit 105 of FIG. 1) and reset the clock (e.g., ClkM) used to capture decoded commands (at, e.g., command decoder 115 of FIG. 1). By resetting these clocks of the other pipeline, the apparatus can prevent the command address bits or decoded commands from being captured in the other pipeline, and the pipeline that first captured the sync pulse can remain operational. For example, in circuit 550, the flip flop component can receive a reset signal that prevents the command address bits or decoded commands from being captured in the odd pipeline.

Circuits 500 and 550 can include circuitry for blocking an unused pipeline (e.g., the pipeline(s) that failed to first receive the command) while the apparatus operates in a geardown mode. For example, the circuits 500 and 550 can include an arrangement of inverter or NOT gates, NAND gates, NOR gates, buffer gates, a set/reset block, or any components used to block a pipeline that was secondary to capture a sync pulse.

Figure 6:
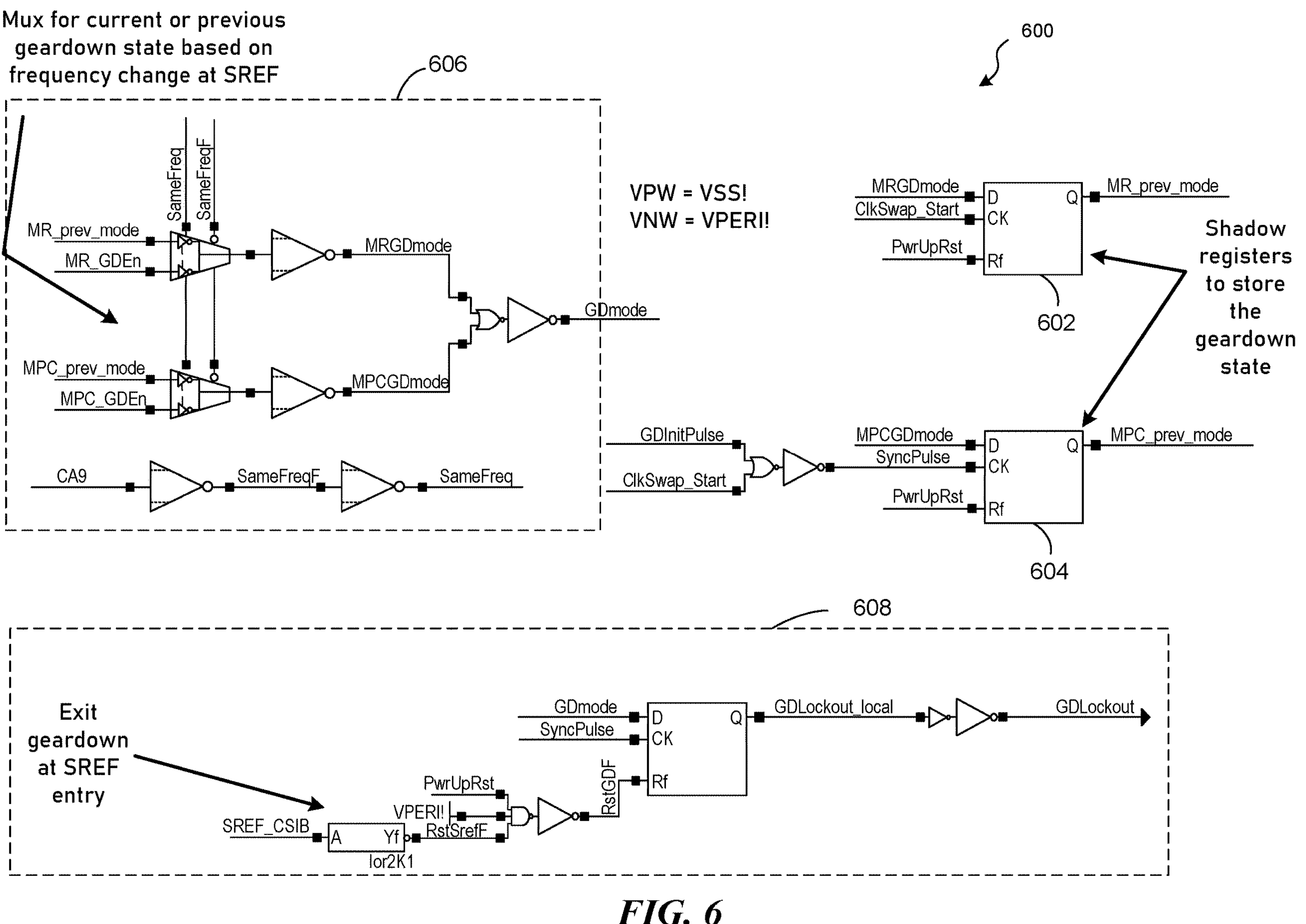
FIG. 6 illustrates circuits configured with entry logic of a geardown mode in accordance with an embodiment of the present technology.

FIG. 6 illustrates a circuit 600 configured with entry logic of a geardown mode in accordance with an embodiment of the present technology. An apparatus (e.g., the apparatus 100 of FIG. 1) can enter a geardown mode through a variety of operations. In some embodiments, an apparatus enters a geardown mode through a model predictive control (MPC) command followed by a sync pulse (e.g., a NOP command). Once the apparatus identifies the pipeline that first captured the sync pulse, the apparatus can suppress/block the other pipelines.

In some embodiments, an apparatus enters a geardown mode through a first NOP of self-refresh exit (SRX) sequence operation that acts as a sync pulse when a mode register bit (e.g., MR13[4]) is set. If the apparatus enters a self-refresh (SREF) operation with the same frequency, the apparatus can ignore the state of the mode register bit and maintain the prior geardown enable/disable state. For example, flip-flop registers (e.g., shadow registers 602 and 604) can store the current geardown state before the apparatus enters a SREF operation. Based on whether the SREF operation is with same frequency or not (present or prior to the SREF operation entry) the geardown state is multiplexed through to be executed at the sync pulse of the SRX sequence operation. For example, a multiplexer circuit (e.g., components 606) can determine whether the apparatus is in the current mode register state or a previous mode register state.

At every SRX sequence operation, the apparatus exits (via, e.g., components 608) the geardown mode and re-syncs with the sync pulse. Due to re-syncing with the sync pulse, as the apparatus enters a SREF operation, the apparatus needs to exit geardown mode so that both the half-frequency clocks (e.g., even clock and odd clock) can toggle. During a geardown mode, the clock associated with the selected pipeline operates, since the pipeline and clock are suppressed. Both the half-frequency clocks need to be operating, so the apparatus can re-capture the sync pulse in the odd or even pipeline and determine the pipeline that needs to be suppressed.

Circuit 600 can include circuitry for an apparatus to enter a geardown mode. For example, circuit 600 can include an arrangement of inverter or NOT gates, NAND gates, NOR gates, buffer gates, a set/reset block, flip-flop registers, multiplexers, or any components or commands used to enter and operate a geardown mode.

Figure 7:
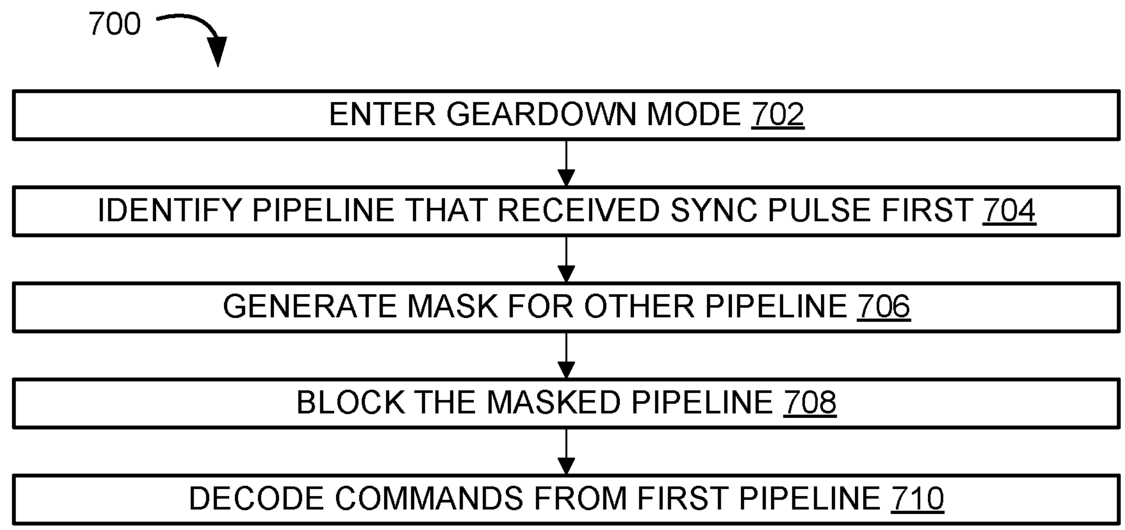
FIG. 7 is a flow diagram illustrating an example method of operating an apparatus in accordance with an embodiment of the present technology.

FIG. 7 is a flow diagram illustrating an example method 700 of operating an apparatus (e.g., the apparatus 100 of FIG. 1) in accordance with an embodiment of the present technology. The method 700 can be for implementing the pipeline identification circuit, pipeline blocking circuit, and/or geardown entry logic circuit described above.

At block 702, the apparatus 100 can enter geardown mode. Apparatus 100 can enter a geardown mode through a variety of operations. In a first example, apparatus 100 enters a geardown mode through an MPC command followed by a sync pulse. In a second example, apparatus 100 enters a geardown mode through a SRX sequence operation with a sync pulse when a mode register bit is set. Additional details regarding geardown mode entry are provided in FIG. 6.

The apparatus 100 can receive a sync pulse (e.g., a NOP command, etc.) from an external device. At block 704, the apparatus 100 can identify the pipeline (e.g., even pipeline or odd pipeline) that first captured the sync pulse. For example, the apparatus 100 identifies the sync pulse in the even pipeline.

At block 706, the apparatus 100 can generate a mask for the pipeline that captured the sync pulse second. For example, once the apparatus 100 identifies that the sync pulse was first captured in the even pipeline, the apparatus 100 generates a mask for the odd pipeline that captured the sync pulse second. Additional details regarding identifying the pipeline that first captured the sync pulse and generating a mask are provided in FIGS. 3 and 4.

At block 708, the apparatus 100 can block/suppress the masked pipeline that did not receive the sync pulse first. For example, once the apparatus 100 identifies that the sync pulse was first captured in the even pipeline, the apparatus 100 blocks/suppresses the odd pipeline so that commands are decoded only in the even pipeline. The apparatus 100 can block the second pipeline by resetting clocks (e.g., a first clock used to capture command address bits, and a second clock used to capture a decoded command) used to receive commands via the second pipeline. Additional details regarding suppressing the pipeline that did not receive the sync pulse first during a geardown mode are provided in FIG. 5. At block 710, the apparatus 100 can decode commands from the pipeline that first captured the sync pulse. For example, the apparatus 100 decodes commands from the even pipeline.

Due to the apparatus 100 operating according to a half-frequency clock in a geardown mode, single clock boundaries (e.g., 1 tCK) can be forced to a double clock boundary (e.g., 2 tCK boundaries) or eliminated while the apparatus 100 operates in geardown mode. For example, whether the controller sets the MPC command of 2N mode as 1N, the apparatus 100 needs to be forced to a 2N state when operating in a geardown mode as all commands are issued on 2N cycles from the sync pulse. If the apparatus 100 operates in a 1N mode, commands can be received according to both the even and odd clock cycles. Additionally, any logic dependent on a single clock (e.g., CA training logic) needs to be changed. Depending on the pipeline (e.g., even or odd pipeline) that is functional in geardown, the clock corresponding to that pipeline must be multiplexed through for the single clock logic to be functional during geardown mode.

Figure 8:
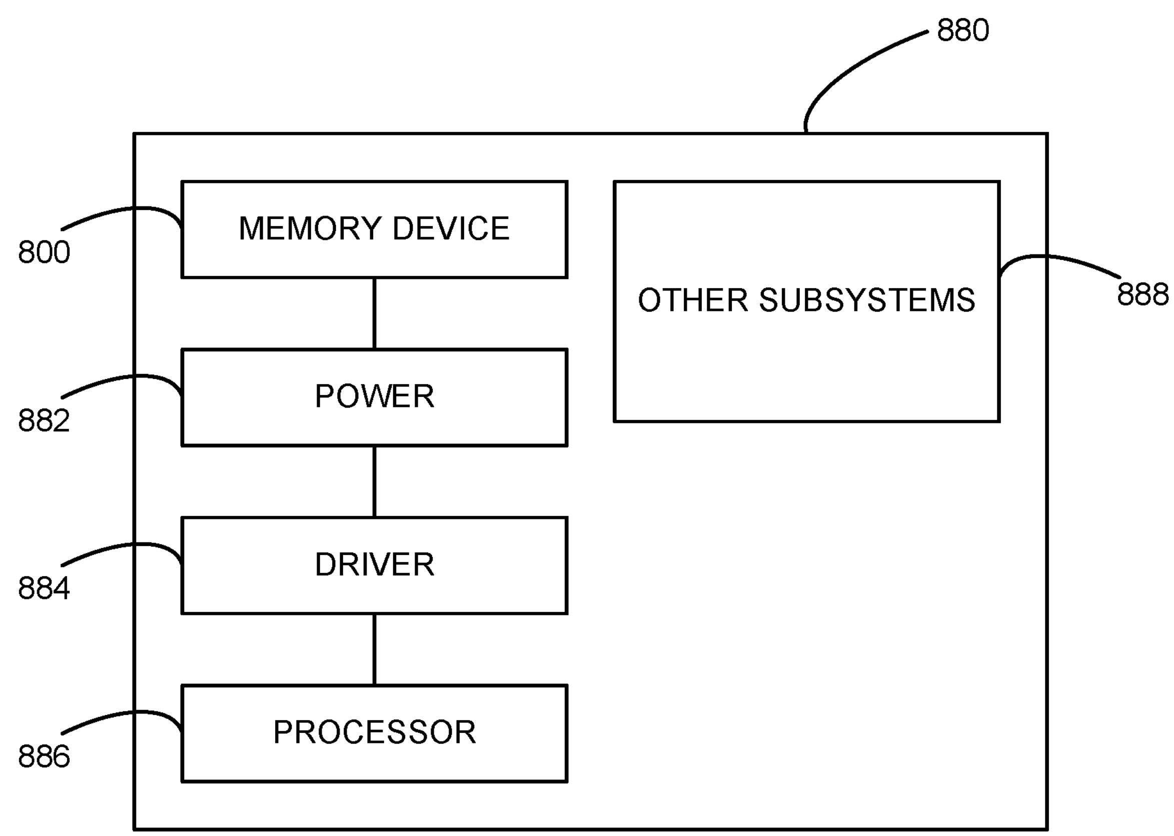
FIG. 8 is a schematic view of a system that includes an apparatus in accordance with embodiments of the present technology.

FIG. 8 is a schematic view of a system that includes an apparatus in accordance with embodiments of the present technology. Any one of the foregoing apparatuses (e.g., memory devices) described above with reference to FIGS. 1-7 can be incorporated into or implemented in memory (e.g., a memory device 800) or any of a myriad of larger and/or more complex systems, a representative example of which is system 880 shown schematically in FIG. 8. The system 880 can include the memory device 800, a power source 882, a driver 884, a processor 886, and/or other subsystems or components 888. The memory device 800 can include features generally similar to those of the apparatus described above with reference to FIGS. 1-7 and can therefore include various features for performing a direct read request from a host device. The resulting system 880 can perform any of a wide variety of functions, such as memory storage, data processing, and/or other suitable functions. Accordingly, representative systems 880 can include, without limitation, hand-held devices (e.g., mobile phones, tablets, digital readers, and digital audio players), computers, vehicles, appliances and other products. Components of the system 880 may be housed in a single unit or distributed over multiple, interconnected units (e.g., through a communications network). The components of the system 880 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term “processing” as used herein includes manipulating signals and data, such as writing or programming, reading, erasing, refreshing, adjusting or changing values, calculating results, executing instructions, assembling, transferring, and/or manipulating data structures. The term data structures includes information arranged as bits, words or code-words, blocks, files, input data, system generated data, such as calculated or generated data, and program data. Further, the term “dynamic” as used herein describes processes, functions, actions or implementation occurring during operation, usage or deployment of a corresponding device, system or embodiment, and after or while running manufacturer’s or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 1-8.

We claim:

1. An apparatus, comprising:

an even pipeline configured to process a portion of data according to an even internal clock produced by dividing an external clock;

an odd pipeline configured to process another portion of data according to an odd internal clock produced by dividing the external clock, the odd internal clock being complementary to the even internal clock;

a command circuit, in a geardown mode, configured to:

identify that a memory operation command was received on one of the even and odd pipelines prior to the other of the even and odd pipelines;

block the other of the even and odd pipelines to prevent the memory operation command from being decoded in and propagating through the other of the even and odd pipelines; and perform the memory operation command through the one of the even and odd pipelines according to the even internal clock or the odd internal clock.

2. The apparatus of claim 1, wherein the command circuit is configured to:

in response to receiving a model predictive control command and the memory operation command, enter the geardown mode, and utilize one of the even and odd pipelines that first received the memory operation command instead of utilizing both the even and odd pipelines to perform the memory operation.

3. The apparatus of claim 1, wherein the command circuit is configured to:

in response to performing a self-refresh entry or exit sequence, enter the geardown mode, and utilize one of the even and odd pipelines that first received the memory operation command instead of utilizing both the even and odd pipelines to perform the memory operation.

4. The apparatus of claim 1, wherein blocking the other of the even and odd pipelines includes:

generating a mask command for the other of the even and odd pipelines;

resetting a first clock used to capture command address bits in the other of the even and odd pipelines; and resetting a second clock used to capture a decoded command in the other of the even and odd pipelines.

5. The apparatus of claim 1, wherein:

the memory operation command is a first no-operation (NOP) command of a self-refresh exit sequence.

6. The apparatus of claim 1, wherein:

the apparatus comprises a Double Data Rate (DDR) Dynamic Random-Access Memory (DRAM) device.

7. The apparatus of claim 1, wherein the apparatus comprises:

a storage array configured to store data;

an external clock circuit configured to receive an external clock having an external frequency, wherein the external clock is shared with an external device; and a command circuit coupled to the external clock circuit and configured to receive commands from the external device for performing memory operations.

8. The apparatus of claim 1, wherein the command circuit is configured to:

identify that the apparatus is operating in the geardown mode, wherein the geardown mode configures the apparatus to perform memory operations at a reduced frequency that is less than an external frequency; and receive the memory operation command on the even pipeline and the odd pipeline while operating in the geardown mode.

9. The apparatus of claim 8, wherein:

the even internal clock and the odd internal clock have an internal frequency that is half of an external frequency of the external clock; and the reduced frequency is half of the external frequency.

10. A memory system comprising:

a memory controller;

a memory array operably coupled to the memory controller;

wherein the memory array comprises:

an even pipeline configured to process a portion of data according to an even internal clock produced by dividing an external clock; and an odd pipeline configured to process another portion of data according to an odd internal clock produced by dividing the external clock, the odd internal clock being complementary to the even internal clock;

the memory array, in a geardown mode, configured to:

identify that a memory operation command was received on one of the even and odd pipelines prior to the other of the even and odd pipelines;

block the other of the even and odd pipelines to prevent the memory operation command from being decoded in and propagating through the other of the even and odd pipelines; and perform the memory operation command through the one of the even and odd pipelines according to the even internal clock or the odd internal clock.

11. The memory system of claim 10, wherein the memory array is further configured to:

in response to receiving a model predictive control command and the memory operation command, enter the geardown mode, and utilize one of the even and odd pipelines that first received the memory operation command instead of utilizing both the even and odd pipelines to perform the memory operation.

12. The memory system of claim 10, wherein the memory array is further configured to:

in response to performing a self-refresh entry or exit sequence, enter the geardown mode, and utilize one of the even and odd pipelines that first received the memory operation command instead of utilizing both the even and odd pipelines to perform the memory operation.

13. The memory system of claim 10, wherein blocking the odd pipeline includes:

generating a mask command for the other of the even and odd pipelines;

resetting a first clock used to capture command address bits in the other of the even and odd pipelines; and resetting a second clock used to capture a decoded command in the other of the even and odd pipelines.

14. The memory system of claim 10, wherein:

the even internal clock and the odd internal clock have an internal frequency that is half of an external frequency of an external clock.

15. The memory system of claim 10, wherein the memory operation command is a first no-operation (NOP) command of a self-refresh exit sequence.

16. A method comprising:

identifying that an apparatus is operating in a geardown mode, wherein the geardown mode configures the apparatus to perform memory operations at a reduced frequency that is less than an external frequency, wherein the apparatus comprises an even pipeline and an odd pipeline configured to process data according to received commands, wherein the even pipeline and the odd pipeline are each configured to process a portion of the data according to an even internal clock and an odd internal clock that respectively correspond to alternating portions or periods of an external clock;

receiving a memory operation command on the even pipeline and the odd pipeline while operating in the geardown mode;

identifying that the memory operation command was received on the even pipeline prior to the odd pipeline;

blocking the odd pipeline to prevent the memory operation command from being decoded in and propagating through the odd pipeline; and performing a memory operation that corresponds to the memory operation through the even pipeline according to the even internal clock and without using the odd pipeline in the geardown mode.

17. The method of claim 16, further comprising:

in response to receiving a model predictive control command and the memory operation command, entering the geardown mode, and utilizing one of the even and odd pipelines that first received the memory operation command instead of utilizing both the even and odd pipelines to perform the memory operation.

18. The method of claim 16, further comprising:

in response to performing a self-refresh entry or exit sequence, enter the geardown mode, and utilize one of the even and odd pipelines that first received the memory operation command instead of utilizing both the even and odd pipelines to perform the memory operation.

19. The method of claim 16, wherein blocking the odd pipeline includes:

generating a mask command for the odd pipeline;

resetting a first clock used to capture command address bits in the odd pipeline; and resetting a second clock used to capture a decoded command in the odd pipeline.

20. The method of claim 16, the even internal clock and the odd internal clock have an internal frequency that is half of the external frequency of the external clock, and wherein the reduced frequency is half of the external frequency.

* * * * *